Oct. 29, 1946.                G. F. WALES                 2,410,372
           METHOD OF AND APPARATUS FOR PUNCHING BY TRANSFER MEANS
                    Filed Dec. 18, 1944        6 Sheets-Sheet 1

INVENTOR.
George F. Wales.

INVENTOR.
George F. Wales

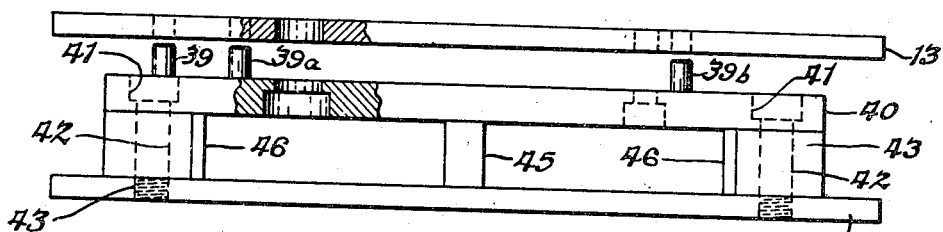
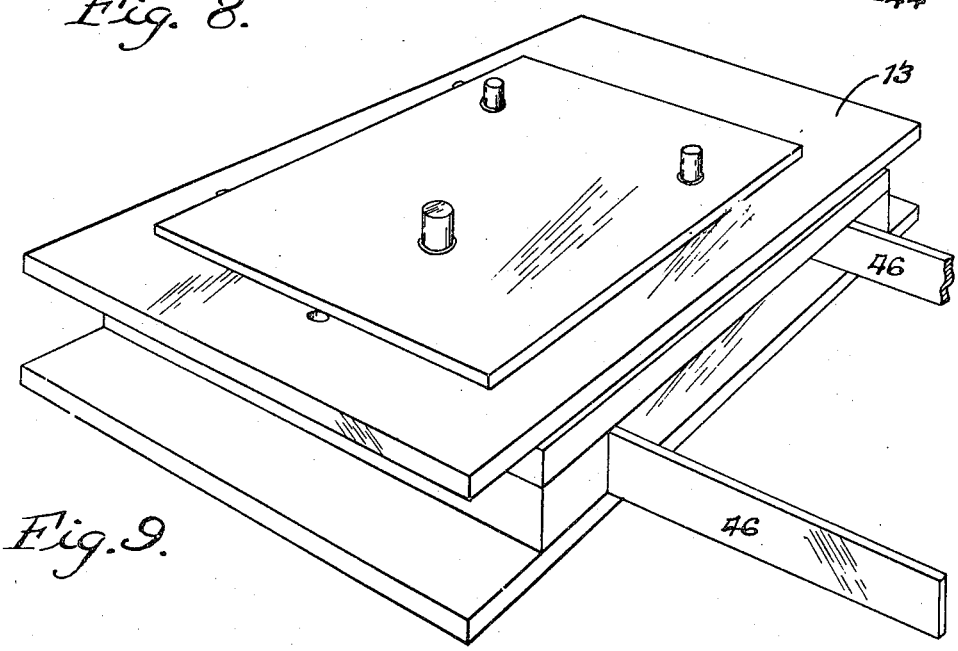
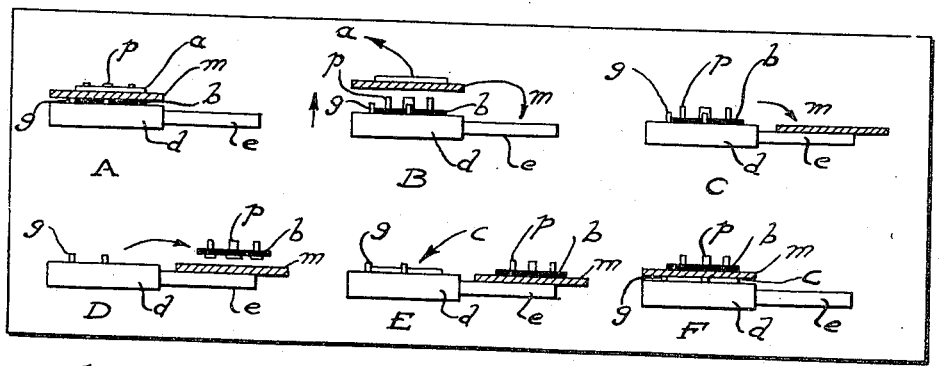

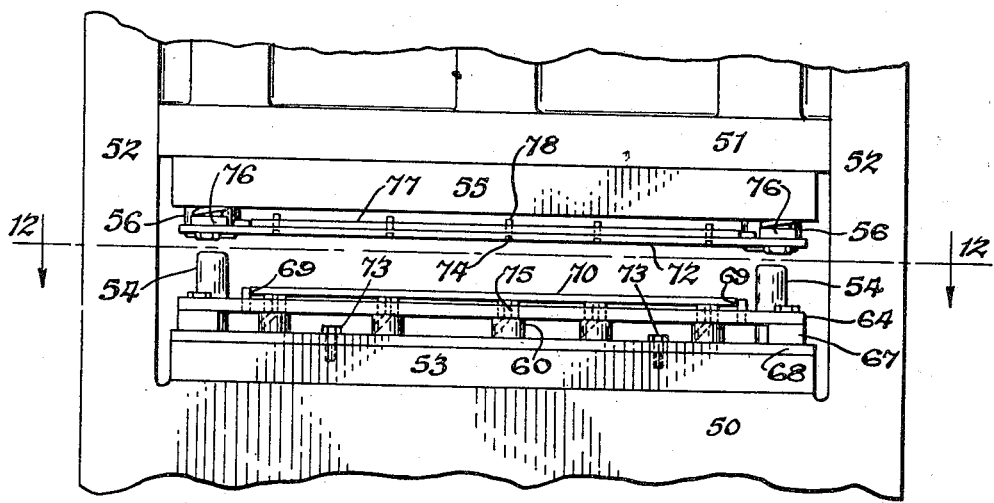
Fig. 11.
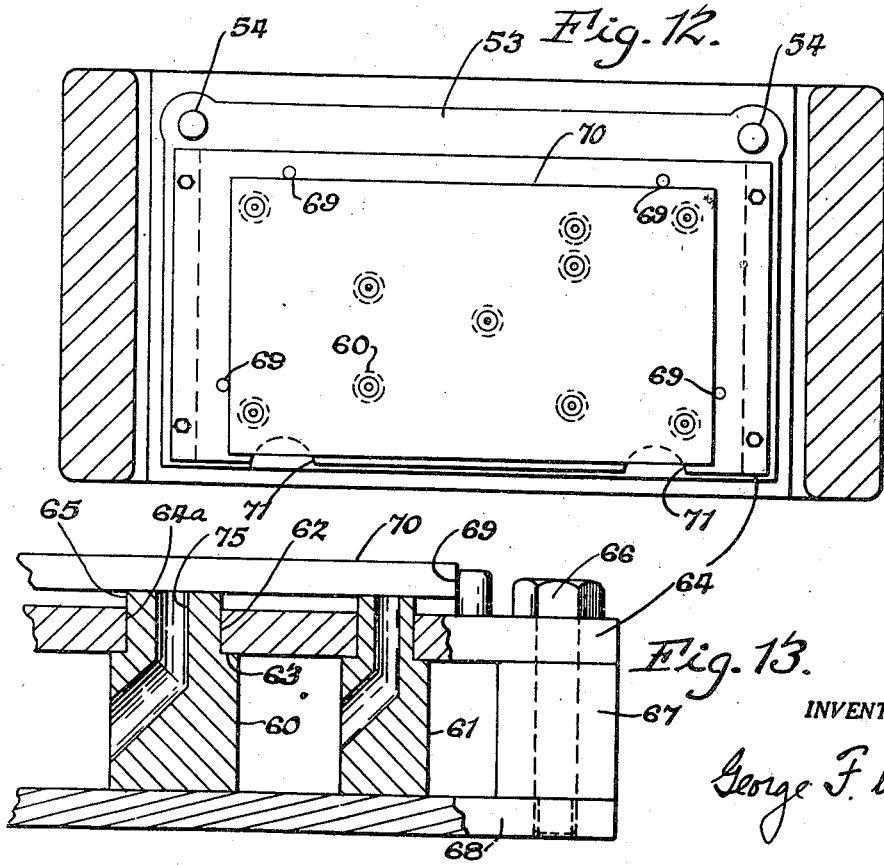
Fig. 12.
Fig. 13.
INVENTOR.
George F. Wales.

INVENTOR.
George F. Wales

Patented Oct. 29, 1946

2,410,372

UNITED STATES PATENT OFFICE 2,410,372

METHOD OF AND APPARATUS FOR PUNCHING BY TRANSFER MEANS

George F. Wales, Kenmore, N. Y.

Application December 18, 1944, Serial No. 568,637

34 Claims. (Cl. 164—94)

This invention relates to a method and apparatus for punching holes in metal members such as flat blanks, sheets, plates, bars and the like although the same may be used in making holes or openings in any other material to which the method and elements may be adapted.

It more particularly relates to a method of punching holes in such members by providing a master punch guiding plate for use with the punch-bit method of punching as described in my co-pending patent application Serial No. 533,270.

My co-pending patent application No. 533,270, "Method of and apparatus for punching by transfer means," discloses a method of punching a multiplicity of holes consisting in lodging a plurality of traveler punch-bits in a first work-piece, then forcibly transferring said bits from one work-piece to another whereby a multiplicity of holes are left in each work-piece from which said punch-bits travel. In that method the two work-pieces are placed in contact with one another and the punch-bits transferred directly from the first piece into the second, then from the second to the third and so on. As the work-pieces involved in that operation are placed together, i. e. one on top of the other with the lower resting on the die elements of the apparatus, it is necessary to provide means for shifting the upper piece so that the punch-bits, which are lodged in it, will always be positioned definitely in operating relation to their companion die apertures. The slight adjustment necessary is made by sleeves in the apparatus, above the work-pieces, which when actuated by the ram of a press, have apertures which engage the upwardly projecting inwardly tapered anvil ends of the punch-bits and cause the entire upper work-piece, in which they are lodged, to shift so that all of the bits are brought into alinement with their die apertures at the same time.

In the present method, the punch-bits are transferred from one work-piece to another through a master punch-bit guiding plate which is interposed between them.

Both of these inventions are based upon the principle of lodging a multiplicity of punch-bits in a work-piece in such manner that it acts as a carrier of said bits until subsequently placed in an apparatus which transfers them into another work-piece.

If the requirement were merely to punch a multiplicity of holes in one work-piece by this punch-bit method, the bits would obviously be pushed clear through the piece and into the die elements, whence they would be gathered up and saved for future use. If, however, a number of work-pieces of a pattern were required it has been the practice heretofore to gather up the punch-bits, place one in each aperture in a jig plate positioned above a work-piece and then to push them completely through the work-piece and die elements and into a receptacle, whence they were gathered up and placed again in the jig plate apertures every time a work-piece was to be punched. Although a number of patents have issued along such lines, the devices and method have never become popular because the difficulty of handling the loose punch-bits has defeated any other advantage which might have accrued to their use.

My improvement resides in arresting the movement of the punch-bits after they have penetrated a work-piece, in such manner that the bits remain tightly gripped by said work-piece. This combination is then placed on the master punch guiding plate with the punch-bits entered in, or at least centered above, their respective master or jig plate apertures. Thus instead of having to gather up a lot of loose punch-bits every time a work-piece is to be punched, as has heretofore been necessary, I merely remove a work-piece having the bits lodged in it from under the jig plate, where it was positioned in order to receive the bits, and place it on top of the jig plate. Thus all of the punch-bits are positioned at one time in their proper positions above their jig plate apertures, ready for the next operation. As will be learned from the drawings and specification the punch-bits are readily located in the apertures of the jig plate because all, or some of them, extend below the bottom of the work-piece a sufficient distance to enter into the apertures.

Before continuing with the description of my apparatus and method, I wish to call attention to Patent No. 2,300,785 issued to Haydon and entitled "Gear stud assembly." While there is some similarity between said invention and the present improved method of punching, it will be manifest from the following description that the concepts and purposes of the two inventions are entirely different and the claims in the present case are drawn to bring out the distinction.

Haydon's invention is one of assembly while the present invention is one of punching. It is not the purpose of his invention to remove the studs in order to obtain open holes in the plate. In his invention, Haydon provides a die element having apertures located at the desired positions upon which he places the member to which the studs are to be assembled. Upon the member he places a jig plate having apertures provided with openings which are spaced in exactly the same relation as the apertures in the die element. The openings in the jig plate and die element are located in axial alinement with one another by means of locating pins which interlock them in their proper relative positions. Loose studs are placed in the apertures of the jig plate in such manner that when the anvil of the press descends, it drives them into the member, the studs acting as punches to punch holes in the member in which they are to remain permanently for use as shafts or pins upon which gears or the like are to be mounted.

As will be seen by the description of the present invention which follows, the improvement as applied to Haydon's device is that a multiplicity of studs previously lodged in another member would be placed on the top of his jig plate with said studs entering into the apertures of the jig plate so that when the ram descended it would force the studs from the upper piece in which they are lodged and through the holes in the jig plate and into the member in which they are to be assembled.

It will now be clear that in the previously mentioned devices, where short punch-bits have been used for punching holes as well as in the Haydon invention, that in order to make preparations for each stroke of an operation, loose punch-bits or studs have had to be placed individually into jig plate apertures formed to accommodate them. This, of course, is a slow and expensive manner of punching holes, as will be seen when the present improvement is understood.

Punch-bits which are pressed through guide plate apertures, and lodged in a work-piece under it, must be definitely positioned in the work-piece in accordance with the pattern of those apertures. It is obvious then, if a work-piece is moved from underneath the guide plate and placed on the other side of it, that the punch-bits are bound to line up perfectly in the same apertures through which they pass, each in its own aperture, every time a transfer is made.

It is with such control of the punch-bits that the present invention is concerned and the method and apparatus is simple in construction, effective in its purpose and economical in its use.

In making a transfer I place a new work-piece in a predetermined position on top of the die elements. This predetermined position is assured for each counterpart by gauging means which contact the edges or some other part of it. The master guide plate may be organized in any manner that positions it above the work-piece which rests on the die elements so that its punch-bit guide apertures are in operative alinement each with a companion die opening. A plurality of punch-bits are positioned on the top side of the master plate and entered into their individual guide apertures by the simple expedient of placing another work-piece, in which the bits are lodged, on top of the guide plate. At least some of the punch-bits project from the under side of the work-piece in which they are lodged a sufficient distance so that they extend into their guide holes when the work-piece is placed on the guide plate and thus locate themselves as well as all other bits properly for operation. No other gauging means for the punch-bit carrying work-piece is necessary unless stops for approximate positioning are desired.

The actual transfer occurs when the punch-bits are moved by pressure applied to their anvil ends, from the top work-piece, through the guide plate apertures and into the lower work-piece where their movement is arrested by limiting the downward motion of the pressure means.

When operated in a stamping press or the like, the extent to which the punch-bits enter or project through the lower work-piece is determined by controlling the setting of the ram. After the transfer is made, the upper work-piece is free of punch-bits although as long as it rests on top of the guide plate, as illustrated in Fig. 3, the anvil ends of the bits remain within the holes. The bits are free in the holes, however, as the anvil ends are reduced in size and after the ram moves out of the way the work-piece may be removed by lifting it alone or together with the guide plate. The lower work-piece in which the bits are lodged is then lifted from the die elements and placed on top of the master plate, a new work-piece is placed on the die elements and the routine repeated until the run of work-pieces desired has been completed.

The principal object of this invention is to provide a method of punching a single hole or a multiplicity of holes in work-pieces.

Another object is to provide a method of punching a multiplicity of holes in work-pieces by lodging a plurality of punch-bits in a first work-piece and then pressing them from their lodging places, through apertures in a guide plate, and relodging them in another work-piece positioned at the opposite side of said plate and resting on die elements having apertures for cooperation with said bits.

A further object is to provide a method for exercising control over a plurality of punch-bits, in the process of punching holes in work-pieces, so that after said bits have been guided through apertures in a jig plate and lodged by pressure in a work-piece, said work-piece, with the bits lodged in it, may be moved from below to above said jig plate while serving as a carrier of said bits, at the same time retaining the bits in exact spaced relation with one another so that when said work-piece is placed above said jig plate, each punch-bit will be in a position to enter into its respective aperture in said jig plate when the operation to transfer said bits from said work-piece, through said jig plate apertures and into another work-piece is performed.

Another object is to provide a method and means for exercising control over a plurality of punch-bits as they are transferred progressively from one work-piece to another, which method consists in moving said bits from the exit ends of their guiding apertures in an apparatus member, to the entering ends of the same apertures while said bits are lodged in a work-piece.

It is a further object to provide a method of transferring one or more punch-bits from a work-piece in which they are lodged, through companion guiding apertures in an apparatus member, and into another work-piece situated on die elements at the exit ends of said apertures.

Another object is to provide the method and means for locating a plurality of punch-bits in axial alinement with their respective apertures in an apparatus member, which method consists in lodging the bits in each successive work-piece so that one or more of them project from said work-piece in such manner that when said work-piece rests on said member, one or more bit ends are axially confined in said apertures preparatory to being pressed therethrough and in being so confined thereby aline all other bits in axial alinement above their respective apertures.

Another object is to provide a method and means for centering in axial alinement a multiplicity of punch-bits, each in its aperture in a jig plate, by lodging said bits in a work-piece so that they project from same into said apertures when said work-piece is placed adjacent to said plate.

A further object is to arrest the movement of punch-bits after they have penetrated a work-piece in such manner that said bits remain tightly gripped by said work-piece with at least some of them projecting beyond the face of said work-piece.

A further object is to provide locating means so that the resultant holes will be in accurate relation with the outside contour of the work-piece.

Another object is to provide means for elevating the master punch plate and to maintain it in vertical alinement so that the punch-bit guide openings are in axial alinement with their cooperating die member apertures.

Another object is to provide a method of locating individual die elements in desired relation to one another by fitting them into a template positioned at the working end portion of said elements.

Another object is to provide an apparatus where the master punch-bit guide plate reciprocates with the ram and carries on its upper face the work-piece which has the punch-bits lodged in it, while the second work-piece which is to receive the punch-bits rests on the stationary die in such manner that when the ram descends it presses the punch-bits out of the first work-piece, through the guide apertures of the master plate, and lodges them in the second work-piece where they remain when the ram ascends, thus leaving holes in the first work-piece which is then removed from above the master plate, as a finished perforated work-piece, and replaced by the second work-piece which has had the punch-bits lodged in it..

Another object is to provide a method of transferring punch mediums from a first work-piece through a master punch plate and into a second work-piece by means of an apparatus in which the master plate and both work-pieces are carried by elements attached to the reciprocating ram of the press.

Another object is to provide a means whereby the first work-piece of a run which has no holes in it, is used to support the punch-bits in the apertures of the master plate prior to having said punch-bits lodged in said work-piece.

These objects and the several novel features of the invention are hereinafter fully described and claimed and the preferred form of construction by which these objects are attained is shown in the accompanying drawings in which:

Fig. 8 is a front elevation, partly in section, of the same apparatus but provides a mounting for the die plate which provides a space for slugs to drop into for easy removal.

Fig. 9 is a perspective view of the apparatus shown in Fig. 8 showing extension bars to assist in the manipulation of the parts.

Fig. 10 is a diagrammatical operation sequence explaining the use of the apparatus of Fig. 9.

Fig. 11 is a front elevation of my device illustrating the preferred manner of mounting the master punch-bit guide plate to the ram of a press.

Fig. 12 is a plan view taken on line 12—12 Fig. 11.

Fig. 13 is a fragmentary front elevation, partly in section, of a method of mounting a plurality of individual die elements in spaced relation to one another by means of a template which positions the working apertures accurately and holds the elements firmly in position.

Figure 14:
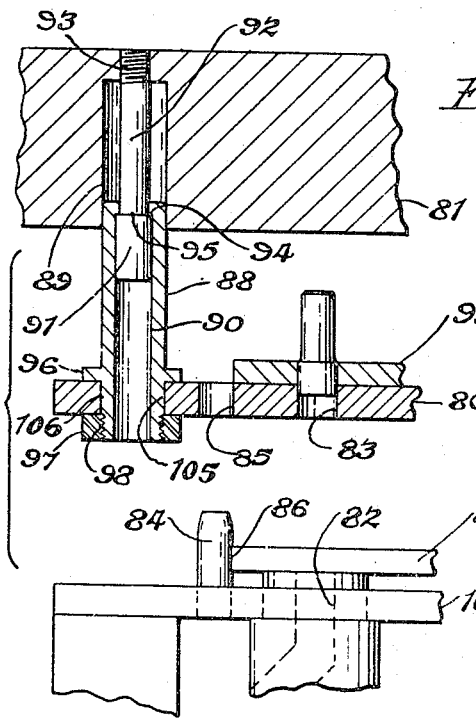

Fig. 14 is a fragmentary front elevation, partly in section, of another method of mounting a punch-bit guide plate to the ram member of a die set for reciprocal movement toward and from the cooperating die mounting which is firmly mounted to the lower shoe of said die set. This view shows the punch carrying member in position as it approaches the die element on the descending stroke of the ram before the punch-bit is transferred to the work-piece resting on the die element.

Figure 15:
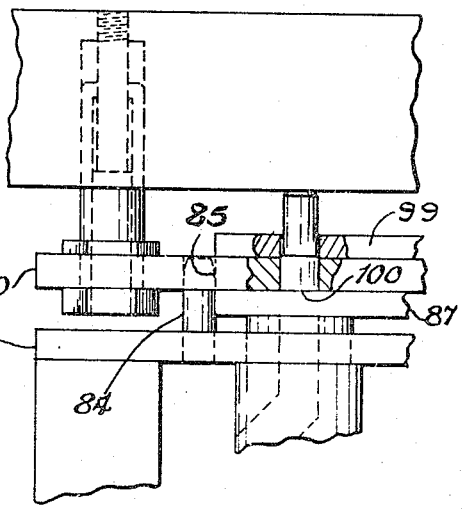

Fig. 15 is a fragmentary view of the same apparatus shown in Fig. 14 but in a partially closed position with the punch-bit having been pressed out of its lodged position in the upper work-piece and with its working end just contacting the top face of the lower work-piece. The alinement pin shown attached to the die plate is in engagement with its cooperating aperture in the punch plate to assure final alinement of the punch-bit and die apertures in the plates, a multiplicity of such pins being used. The pins as shown may also be used as work-positioning guides for locating the lower work-piece properly in relation to the apertures.

Figure 16:
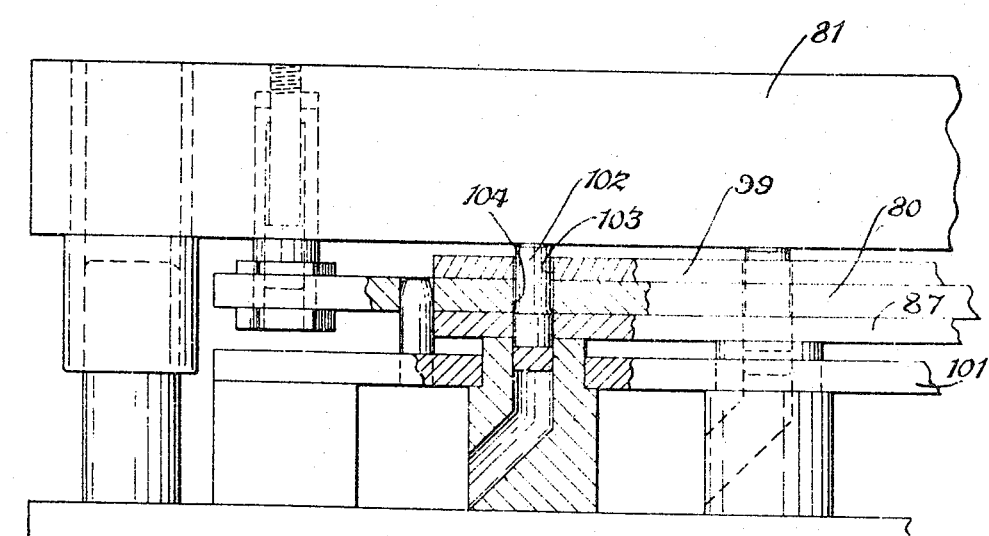

Fig. 16 is a fragmentary front elevation, partly in section, of the apparatus shown in Figs. 14 and 15 at the lowermost position of the ram, with the punch-bit driven into the lower work-piece and partially into the die aperture, but still being tightly seized by the work-piece. This view illustrates how the anvil end of the punch-bit is reduced to free it from the hole in the upper work-piece.

Figure 17:
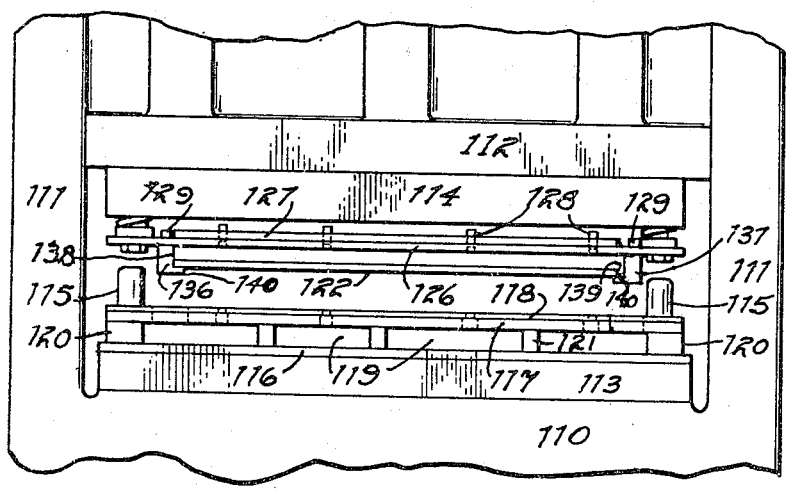

Fig. 17 is a front elevation of an apparatus similar to that shown in Fig. 11 except that the punch plate is provided with means for carrying the work-piece in which the punch-bits are to be lodged.

Figure 18:
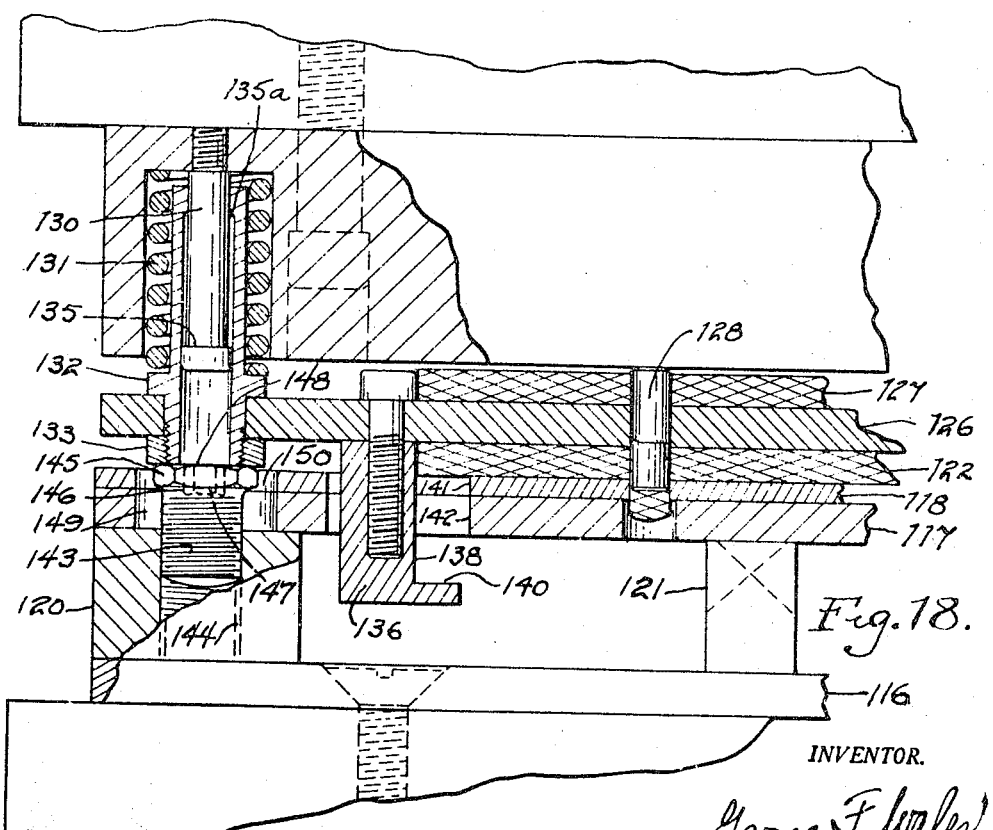

Fig. 18 is an enlarged fragmentary vertical section of the apparatus shown in Fig. 17 illustrating how the elements appear when the reciprocating ram is in its lowermost position in which the punch-bits are transferred from the work-piece above the punch plate into the work-piece below it.

In the following description similar characters of reference indicate like parts in the several figures of the drawings.

Figure 1:
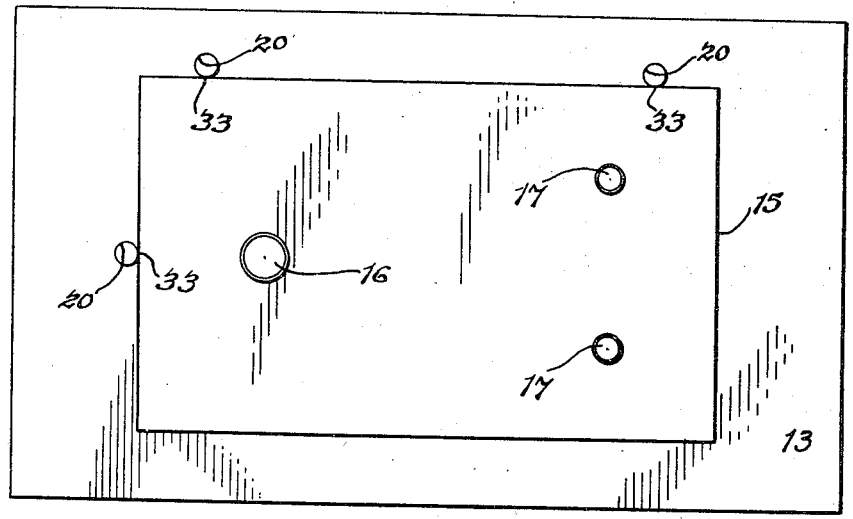
Fig. 1 is a top plan view of an elementary form of apparatus showing a work-piece, having punch-bits lodged in it, placed upon a master plate as shown in Fig. 2.
Figure 2:
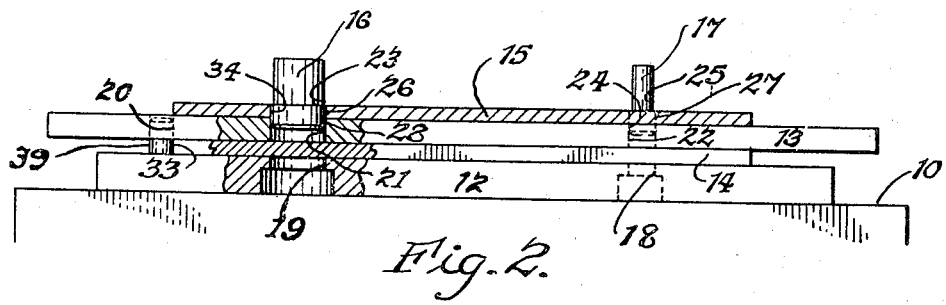
Fig. 2 is a front elevation of Fig. 1, partially in section, illustrating the basic principle of this invention. The apparatus is shown with the punch-bits lodged in the upper work-piece ready to be transferred into the work-piece resting between the two plates.
Figure 3:
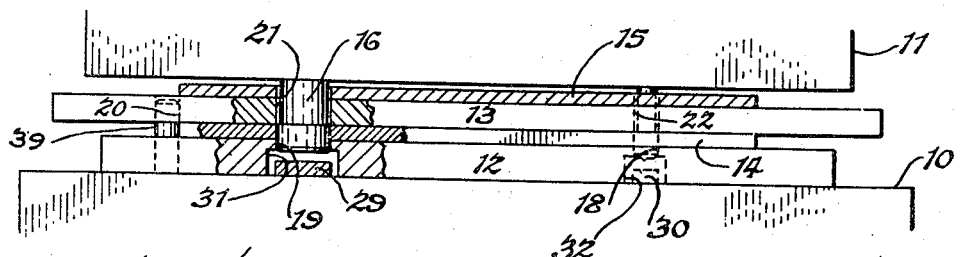
Fig. 3 is the same as Fig. 2 but with the bits transferred into the lower work-piece thereby leaving the upper piece with holes in it.

In Figures 1, 2 and 3, the numeral 10 represents the bed or bolster plate of a stamping press having a ram 11 which reciprocates toward and from said bed. Numeral 12 represents a die element plate which is provided with die openings 18 and 19 which represent a multiplicity of holes located in said die plate according to a pattern of holes which are to be punched in a work-piece 14 which is placed on the upper face of said plate. 13 represents a punch-bit guide plate which is provided with a pattern of holes which is an exact duplicate of the pattern formed in the companion die plate and which are represented by numerals 21 and 22. As illustrated in Figs. 1 and 2, die plate 12 is provided with a plurality of alinement pins 39 which fit closely into the apertures 20 of plate 13. As these pins and apertures are in exact relation to the openings which form the pattern of holes in plates 12 and 13 they serve the purpose of aligning said holes so that when work-piece 14 is placed between said plates the holes will be in axial alinement. Numerals 16 and 17 represent punch-bits which are lodged in work-piece 15 as will be described later. It will be observed that punch-bit 16 is provided with a body 34 which is the full size of the hole to be punched, and an anvil end 23, which is reduced so as to be smaller in size than said body. Likewise, punch-bit 17 is provided with a body 24 of full diameter and an anvil end 25 of smaller size. These punch-bits are lodged in their respective openings 26 and 27 in work-piece 15 so that they are held tightly in the position as illustrated in Fig. 2. Punch-bit 16 as illustrated in Fig. 2 extends beyond the lower face of work-piece 15 so that it is entered into the aperture 21 of plate 13 as indicated by numeral 28 a sufficient distance to locate itself in the opening. Likewise the working end 24 of punch-bit 17 extends into the opening 22 of the guide plate so that it also locates itself in its opening in plate 13. With punch-bits 16 and 17 gripped tightly in work-piece 15 and held in vertical relation thereto, it is evident that any quantity of similar bits would also be positioned in their particular openings in plate 13 because all such punch-bits could be made to project into their guide openings if desired.

As illustrated in Fig. 2, the apparatus is placed upon the bed 10 of the press and is shown ready to have the punch-bits transferred by ram power from upper work-piece 15 through the guide apertures of plate 13 and into lower work-piece 14 where they lodge themselves while at the same time removing slugs 29 and 30 as illustrated in Fig. 3 which shows the apparatus at the completion or lower-most position of the ram stroke. In the type of press in which this apparatus is operated, the ram is automatically elevated and caused to dwell at the top of its stroke until a clutch is tripped to cause it to make another cycle. After the ram has gotten out of the way it will be obvious from Fig. 3 that the upper work-piece 15 may be freely lifted from the upper face of plate 13 as the punch-bits, all having reduced anvil ends, no longer are seized by said upper work-piece. Likewise plate 13 may be lifted from its resting place on the lower work-piece 14, which now has the punch-bits embedded in it, because the reduced anvil ends of the punch-bits extend entirely through the openings in same. With upper work-piece 15 and guide plate 13 removed from the apparatus as it is illustrated in Fig. 3, it is a simple matter to remove lower work-piece 14, which now has the punch-bits lodged in it, from die plate 12. In order to clear the slugs 29 and 30 from the enlarged cavities 31 and 32 formed in the under side of the die plate, it is necessary to slide the plate on the bolster of the press so that all of the openings are moved outwardly beyond the edge of the bolster thereby causing the slugs to fall into a receptacle, or the plate may be elevated and the slugs brushed or blown from beneath it. Plate 12 after the slugs have been removed, is then placed in its original position, a new plain work-piece is placed upon it, the guide plate 13 is then placed upon the new work-piece and the work-piece which now has the punch-bits lodged in it is placed on the guide plate and the apparatus then appears as shown in Fig. 2.

It is obvious that any means may be used for locating the plain work-piece 14 as illustrated in Fig. 2, although I preferably show that the alinement pins 39 are also used for gauging the work-piece as indicated by numerals 33. As illustrated in Fig. 2, it is obvious that it is unnecessary to have gauging means 33 project above punch guide plate 13 as the punch-bits locate themselves definitely in their respective openings when placed on said plate.

From the above description it will be seen that a multiplicity of punch-bits may be transferred from one work-piece to another by simply pressing them out of the first work-piece, through guide openings in a master plate, into the second work-piece, and then repeating the operation until the desired number of work-pieces have holes punched in them.

Figs. 4 to 7 inclusive are used to simplify the explanation and to show how the start of a run is made.

Figure 4:
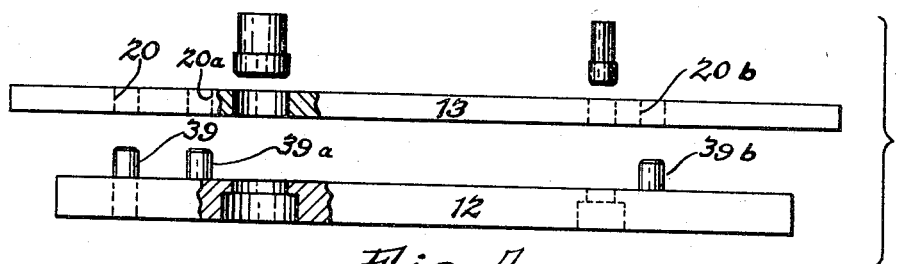
Fig. 4 is a front elevation of the basic elements required in this invention and include a die plate having work locating means, a master punch-guide plate having means by which its openings are positioned in axial alinement with the die apertures, and punch-bits having reduced anvil ends.

In Fig. 4 die element plate 12 is provided with the combined alinement and gauge pins 39, 39a and 39b and punch-bit guide plate 13 is provided with the companion openings 20, 20a and 20b.

Figure 5:
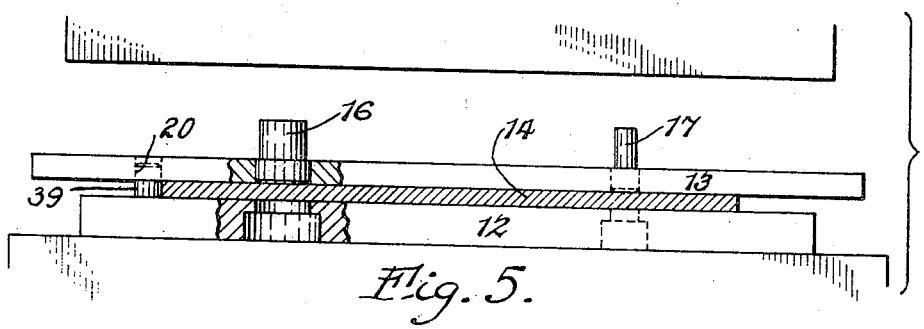
Fig. 5 illustrates how the first piece of a production run is placed in the apparatus of Fig. 4 in preparation for lodging the punch-bits in it.
Figure 6:
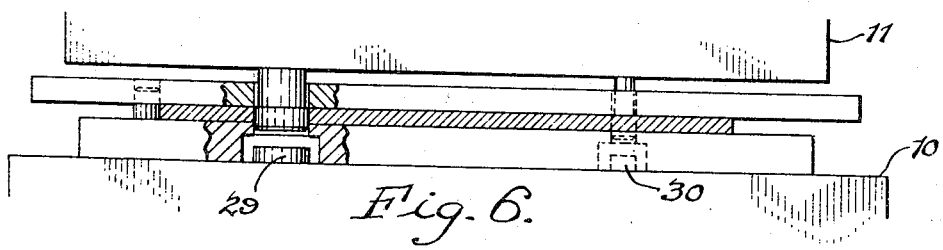
Fig. 6 is the same as Fig. 5 but with the punch-bits lodged in the work-piece.

Fig. 5 illustrates how work-piece 14 is placed upon die plate 12 after which punch-bit guide plate 13 is lowered so that openings 20 engage guide pins 39, thereby positioning each punch-bit guide aperture in axial relation with its companion die opening. Punch-bits 16 and 17 are then placed in the openings of plate 13 ready to be driven by the ram of the press through the work-piece and lodged therein, as shown in Fig. 6, simultaneously removing from the work-piece slugs 29 and 30.

Figure 7:
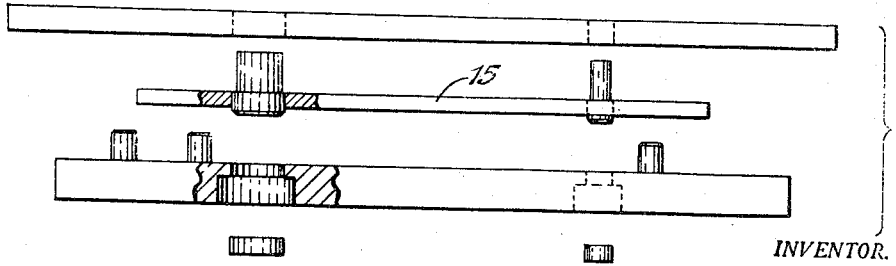
Fig. 7 is the same as Fig. 6 with the members separated to illustrate how the bits are lodged in the work-piece after which it becomes the top work-piece of Fig. 2.

After the ram 11 of the press has ascended out of the way, the elements are separated as indicated by Fig. 7, the result of the operation being that work-piece 15 having the punch-bits lodged in it has been obtained ready to be placed in position as shown in Fig. 2, so that thereafter with every stroke of the press an operation is performed transferring the bits from their position as shown in Fig. 2 to Fig. 3, and with every stroke of the press a finished perforated work-piece is obtained.

The description of the apparatus as described above explains this method and apparatus in its fundamental state.

Obviously innumerable adaptations of the principle may be made and it is to be understood that this patent anticipates all of them and that the scope of this invention is not limited to the particular forms of apparatus illustrated in the drawings.

As an indication of how this apparatus may be elaborated upon I show in Figs. 8 and 9 how the elementary die plate just described may be mounted in spaced relation above the bed or bolster of a press in such manner that the slugs drop through the die openings directly into an open space from which they may be readily removed as illustrated in Fig. 8. Die plate 40 is similar to die plate 12 in the previous illustrations, the difference being that it is provided with counterbored holes 41 which accommodate cap screws 42 which extend through spacer blocks 43 and fasten a lower plate 44 to them to form a die element unit providing a space for accommodation of the slugs. If desired, one or more additional spacer elements 45 may be provided to support die plate 40 when it becomes of such size that supports are required.

The numerals 46 represent an extension means which may be attached to the apparatus to provide a resting place for the punch guide plate 13 when the plates are to be changed manually. If desired this means may be loose, for movement back and forth, and may have a cross bar to scrape the slugs out of space below the dies.

Fig. 10 illustrates the purpose of the extension rests and describes the manual operation clearly. In Fig. 10 the following letters represent the work-pieces and parts of the apparatus. (a) upper work-piece, (b) lower work-piece, (d) die element, (e) extension bars, (g) gauge pins, (m) master punch-bit guide plate, (p) punch-bits.

A illustrates the apparatus after the punch-bits have been transferred from plate a and lodged in plate b. After the part of the operation shown at A has been performed, the procedure is as follows:

As illustrated by view B plate m is lifted from the apparatus as shown, and may be tilted so that part a which is now a finished perforated work-piece slides from said plate onto a receiver for said finished parts, and then m is placed upon e as shown at C. Of course, work-piece a may be removed before m or it may be removed after m has been placed upon e. At any rate, work-piece a is completed and removed from further illustration.

As illustrated by C, m rests upon e. Work-piece b having the punch-bits p lodged in it is still in position on die element plate d.

As shown at D this work-piece b together with the punch-bits is removed from the die plate and placed in position with the punch-bits in their apertures on master plate m. A new work-piece c is now placed upon die element d being located by having its edges pressed into contact with the gauges g as shown at E. Then master plate m which now carries work-piece b and punch-bits p is placed in its axially alined position as illustrated at F and the apparatus is then ready to have the ram drive the punch-bits into c thereby completing the cycle.

Having thus illustrated how the apparatus is operated in its simplest form, I shall now describe how the elements may be applied to a machine for more proficient operation.

In Fig. 11, the numeral 50 represents the bed of a stamping press, 51 the reciprocating ram and 52 the columns which guide the ram in vertical relation toward and from the bed. In this case I use the term "die set" to mean a die shoe 53 having guide posts 54 firmly mounted to it and punch holder shoe 55 having guide bushings 56 firmly mounted in it, which bushings have bearing apertures which slidably engage said guide posts to cause said shoes to operate in alinement.

In Fig. 13, I show a novel method of mounting individual die elements 60 and 61 in a box-like structure which locates said die elements accurately in relation to one another, which provides ample slug clearance room, and which provides a die element assembly unit which may be rapidly mounted on the shoe 53 of a die set and which may also be removed readily so that a similar unit having a different pattern of holes may replace it. In the organization of this die assembly unit the die element 60 is provided with an accurately sized locating diameter 62 reduced from the body to provide a limiting face 63 on which a template 64 rests, diameter 62 being accurately sized to fit tightly into template aperture 64a and being of a length which causes it to project above the upper face of said template as indicated by numeral 65. After the die elements 60 and 61, which indicate that a multiplicity of any number of similar units may be assembled in the template, are located in their proper apertures, the plate is placed upon spacers 67, which may be assembled tightly to a base plate 68, and the plates are then held together by means of a multiplicity of screws 66. A multiplicity of gauge pins 69 may be fastened to template 64 for locating the work-piece 70 in exact relation with the die apertures.

As indicated in Fig 12 template 64 may be provided with hand openings 71 to provide clearance so the work-piece may be seized when feeding or removing same. The assembled die element unit after being accurately located with the die element apertures in coaxial alinement with the punch-bit guiding apertures of the guide plate 72, is firmly fastened to die shoe 53 by means of cap screws 73 which extend through lower plate 68 and into threaded openings in the shoe.

The organization of the upper portion of the assemblage as illustrated in Fig. 11 consists of mounting the master punch-bit guide plate 72, having a multiplicity of apertures 74 each in axial relation with its companion die aperture 75, to the ram shoe by means of yieldable supporting means 76.

In operation the plain work-piece 70 is placed in the apparatus so that it rests on the upper faces of the die elements 60, 61, being properly located in position by gauge means 69. Work-piece 77, carrying a multiplicity of punch-bits 78 is placed in the space between upper shoe 55 and guide plate 72 so that it rests upon the latter with each punch-bit 78 in its guide aperture 74.

In operation the ram of the press is caused to make one stroke and in doing so guide plate 72 contacts work-piece 70 and dwells thereon under pressure of resilient elements 76, while shoe 55 continues its downward motion until it drives punch-bits 78 downward through guide apertures 74 and lodges them in the work-piece 70. Then the ram ascends and carries work-piece 77 with it. Work-piece 77 is now free of the punch-bits and has holes remaining in their place, the punch-bits being lodged in work-piece 70 which still rests on the die elements. Finished work-piece 77 is then removed from plate 72 and replaced by work-piece 70, which now has the punch-bits lodged in it, and as explained above, is properly located because the punch-bits project into their individual guide holes. A new blank work-piece is placed upon the die elements and the operation is repeated until the desired number of work-pieces has been run.

In Figs. 14, 15 and 16, I illustrate an alternate form of apparatus wherein the master punch plate 80 hangs by its own weight suspended below the upper shoe 81 of a die set and is held there by means of a plurality of telescopic linkages. These linkages are so constructed as to provide accurate vertical movement of plate 80 so that in operation apertures 83 are always in axial alinement with die apertures 82. As illustrated in Fig. 14 plate 80 is shown in an elevated position above the stationary die element which is the same as was described in connection with the illustration shown in Fig. 13.

In Fig. 14 numeral 84 represents a guide pin which catches hole 85 as plate 80 approaches it and aligns plate 80 in exact relation with the die members so that the die openings 82 and punch-bit guide apertures 83 are in axial relation with one another. Obviously a multiplicity of the guide means 84 and 85 are desirable and pins 84 may be used, as indicated by numeral 86, as gauge means for positioning work-piece 87 in proper relation to the die elements.

As illustrated in Fig. 14 the linkage which guides and supports the guide plate 80, consists of sleeve 88 which is a sliding fit in a bearing 89 provided in upper punch shoe 81. Sleeve 88 is provided with a central opening 90 which accommodates the head 91 of screw 92 which is threaded into 81 as indicated by numeral 93. Both the diameter of the head 91 which is a sliding fit in opening 90, and diameter 88 which is a sliding fit in opening 89, serve the purpose of guiding the sleeve in close vertical movement with the die set. The sleeve is provided with a reduced innermost section to form an inwardly facing shoulder 94 for engagement with shoulder 95 of the screw to limit the travel of guide plate 80 in relation to the lower face of the upper shoe 81. At its plate engaging end, this sleeve is provided with an enlargement which forms a bearing 96 against which the upper face of plate 80 rests when assembled to said sleeve and is held there by any conventional means such as nut 97 which cooperates with threaded portion 98 for that purpose. Bearing apertures 105 in plate 80 fit closely around bearings 106 of guide sleeve 88 to prevent any horizontal movement of the plate.

As explained previously, in connection with the apparatus shown in Fig. 11, the upper work-piece 99 which carries a multiplicity of punch-bits is placed upon plate 80, as illustrated in Fig. 14. Fig. 15 shows the apparatus illustrated in Fig. 14 in a partly descending position wherein the lower face of the punch-bit is just contacting the upper face of the lower work-piece as indicated by numeral 100 and shows how a plurality of gauge pins 84 operate to align plates 80 and 101 just before the bits are driven into work-piece 87.

Fig. 16 illustrates the apparatus shown in Figs. 14 and 15 more fully and shows the apparatus at the lower-most part of its stroke in which the punch-bits have been driven into the lower work-piece and shows the clearance which exists between the shanks 102 of the punch-bits and the openings 103 and 104 in the upper work-piece 99 and guide plate 80. As the ram of the press ascends carrying the upper portion of the apparatus with it, work-piece 87 remains in its position resting on the faces of the die elements and the punch-bits remain lodged in it. Owing to the reduction in the diameters of the punch-bits, work-piece 99 is lifted clear of the punch-bits by plate 80 which comes to rest in an elevated position as indicated in Fig. 14 so that the perforated work-piece may be slid from its position on top of plate 80 and the lower work-piece 87, which now has the punch-bits lodged in it, positioned on top of the plate as indicated by numeral 99, after which a new work-piece 87 is placed on the dies and the operation repeated until the desired number of work-pieces is run.

In Figs. 17 and 18, I illustrate an alternate form of apparatus of the type shown in Fig. 11, the principal difference being that a means is provided under the master punch plate for carrying the under work-piece with it as I shall now describe.

Numeral 110 represents a press bed; 111 the columns; and 112 the ram which reciprocates toward and from the bed. To the bed, a bolster plate is usually attached, but in the illustrations I omit this plate and show the die shoe 113 mounted directly to the press bed where it is tightly fastened. 114 is the punch holder member of a die set and 115 the guide posts which cause the punch holder to move in vertical alinement with the die shoe.

The die set, consisting of die shoe 113, punch holder 114 and guide posts 115, may remain in the press to be used as a general purpose mounting means for punch and die plates having different patterns of holes or the entire assemblage may be changed, if desired.

Numeral 116 inlicates a die mounting base plate; 117 a die supporting plate and 118 a die plate which is usually combined permanently with its supporting plate. In this instance a space 119 is provided under the supporting plate by mounting this pate on supports 120 and 121 to provide room for removal of the punched out slugs which accumulate thereunder.

Numeral 126 represents the master punch plate; 127 the upper work-piece and 128 the punch-bits which are lodged therein. 129 indicates approximate work gauging means although the final accurate gauging comes from the punch-bits entering into the master plate apertures as explained previously.

Master plate 126 is yieldably mounted to punch holder 114 by means of a plurality of resilient members a preferred form of which is illustrated in Fig. 18 wherein 130 is a mounting bolt; 131 a spring; 132 a sleeve and 133 a nut which holds the master plate tightly to the sleeve.

The extent to which the sleeve may move in relation to the face of the punch holder is limited by internal shoulder 135a engaging the underside of the head 135 when the spring expands. A plurality of these units are mounted so as to maintain the master plate in parallel relation to the punch holder face at all times.

Under master plate 126 are attached a suitable number of work positioning and lifting members 136 and 137. Members 136 are provided with gauge faces 138 against which the work-piece is placed prior to receiving the punch-bits 128 when the press is operated. Members 137 are similar to 136 but are set away from the work to provide clearance 139 so that the work may be readily placed on the ledges 140 of the members.

In operation the work-pieces are placed in the apparatus as illustrated in Fig. 17; then the clutch of the press is tripped, causing the ram to make one reciprocating cycle. At the lowermost point of its stroke the apparatus appears as shown in Fig. 18.

It will be noted that member 136 projects into openings 141 and 142 which are provided to accommodate it. As the ram ascends and returns to its elevated position, work-piece 127 has parted with punch-bits 128 which are then lodged in the under work-piece 122, and this work-piece is lifted upward from the die plate 118 by the ledges 140. In this position the work-piece 127 may be readily slid from its position above master plate 126. Lower work-piece 122, which has the punch-bits in it, is then placed in position above master plate 126; a new work-piece 122 is inserted on ledges 140 and located against stops 138 and the operation is then repeated.

When the master punch plate is resiliently mounted to the upper holder as illustrated by elements 76 in Fig. 11 and by numerals 130 to 135 inclusive in Fig. 18, it is possible that the plates may tend to bend under the weight of the spring pressure, if heavy, due to the overhang of the plate as it rests on the lower work-piece. In such event any supporting means may be used to counteract this pressure to prevent such bending.

By way of example I show, in Fig. 18, one of a plurality of vertically adjustable screw elements 143 having threads for engagement with threaded openings 144 in supports 120. Each element may be provided with an enlarged head 145 of irregular shape to accommodate an exterior wrench or with a socket 146 to accommodate a socket wrench for the purpose of adjusting the element in relation to its carrier.

As shown in the illustration, element 143 is adjusted so that its upper face 147 engages the bottom face 148 of the resilient member at a position which supports the extending portions of plate 126 on the same plane with that portion which rests on work-piece 122 and thereby prevents bending of plate 126. If work-piece 122 were thinner than shown the screw element would be screwed downward to compensate for the difference in thickness and if thicker it would be screwed upwardly. Plates 117 and 118 are provided with clearance openings 149 and 150 of sufficient size to accommodate screw head 145 or nut 133 without interference.

Although the form shown in the drawings represents a practical embodiment of my invention, it is to be understood that the same may be varied as to details and still contain the essence of my improvements as summed up in the following claims.

I claim as my invention:

1. A method of manufacture consisting in transferring a plurality of punch mediums by pressure from their lodging places in one of two work-pieces, to guide means located between said work-pieces, thence into lodging places which they form in the other of the work-pieces.

2. A method of manufacture consisting in transferring a plurality of punch mediums by pressure from their lodging places in one work-piece, through a guide plate accurately apertured to receive and guide said punch mediums, into lodging places which they form in a second work-piece.

3. A method of manufacture consisting in transferring a plurality of punch mediums by pressure from their lodging places in one work-piece, through a guide plate accurately apertured to receive and guide said punch mediums, into lodging places which they form in a second work-piece by forcing slugs into die openings axially alined with said guide plate apertures.

4. A method of punching consisting of lodging a plurality of traveler punch-bits in a first work-piece, placing said work-piece on a guide plate having apertures accurately formed to receive and guide said punch-bits, then placing a second work-piece on die elements under said guide plate, said die elements having openings formed in axial alinement with said apertures, then applying pressure on said punch-bits to transfer same from their lodging places in said first work-piece through said apertures and into lodging places which they form in said second work-piece by forcing slugs into said die openings.

5. A method of punching consisting in lodging a plurality of traveler punch-bits in a work-piece, then forceably transferring said bits from said work-piece to another through an interposed guide plate provided with means for guiding said punch-bits, whereby a multiplicity of holes are left in the work-piece from which said punch-bits are transferred.

6. A method of punching consisting in lodging a plurality of traveler punch-bits in a work-piece, then forceably transferring said bits from said work-piece to another through an interposed guide plate provided with means for guiding said punch-bits, whereby a multiplicity of holes are left in each work-piece from which said punch-bits are transferred and whereby the last work-piece of a run receives said punch-bits and retains them in readiness for the start of a subsequent run.

7. A method of manufacture involving two work-pieces, consisting in transferring a plurality of tool mediums from their lodging places in one of the work-pieces, to guide means interposed between said work-pieces, thence to the second work-piece.

8. In a method of manufacture consisting in transferring a plurality of tool mediums from their lodging place in one work-piece, through an interposed guide plate provided with means for guiding said tool mediums into a second work-piece, the step of causing said mediums to form lodging places for themselves in said second work-piece by forcing material out of it and into receiving mediums.

9. A method of multiple punching consisting in lodging a plurality of punches in a work-piece, placing said work-piece and lodged punches on a guide plate having apertures accurately formed to guide said punches, placing a second work-piece under said guide plate with both work-pieces being located in identical relation with said apertures, then applying pressure on said punches, whereby same are transferred from their lodging places in the first work-piece, through said guide plate apertures, into said second work-piece, while simultaneously removing material from said second work-piece, and forcing said material into die openings which cooperate with said punches to form lodging places for said punches in said second work-piece and produce holes in said first work-piece.

10. A method of punching a multiplicity of holes in a quantity of work-pieces consisting in placing a traveler punch-bit in each of a plurality of apertures in a master plate placed above the first work-piece, driving said punch-bits by pressure into said work-piece thereby driving the slugs formed by said punch-bits into companion die openings, and then placing said work-piece and lodged punch-bits on said master plate, driving said punch-bits from their lodging places in said work-piece through the apertures in said master plate and lodging them in a second work-piece, and then placing said second work-piece and lodged punch-bits on said master plate and transferring the punch-bits in the same manner to a third work-piece and then repeating the performance until the desired quantity of work-pieces has been punched.

11. A method of punching consisting of lodging a traveler punch-bit in a first work-piece, placing said work-piece on a guide plate having a hole accurately formed to receive said punch-bit, placing a second work-piece on a die element companion to said punch-bit and under said guide plate and then applying pressure on said bit to transfer it from its lodging place in said first work-piece through said aperture and into a lodging place which it forms in said second work-piece.

12. A method of punching consisting in lodging a traveler punch-bit in a first work-piece then forceably transferring said bit from one work-piece to another, through an interposed guide plate, whereby a hole is left in each work-piece from which said punch-bit travels, and whereby said last work-piece of a run receives said punch-bit and retains it in readiness for the start of a subsequent run.

13. In a method of manufacture consisting in transferring a tool medium from its lodging place in one work-piece through an interposed guide plate, into a second work-piece, the step of causing said medium to form a lodging place for itself in said second work-piece by forcing material out of it and into a receiving medium.

14. A method of punching consisting in lodging a punch in a work-piece, placing said work-piece and lodged punch on a guide plate having an aperture accurately formed to receive said punch, placing a second work-piece under said guide plate with both work-pieces being positioned in identical relation with said aperture, then applying pressure on said punch whereby same is transferred from its lodging place in the first work-piece, through said aperture into said second work-piece, while simultaneously removing material from said second work-piece and forcing said material into a die opening to form a lodging place in said second work-piece and form a hole in said first work-piece.

15. A method of punching consisting in placing a punch-bit detachably in a retainer, driving said punch-bit into a work-piece, driving the slug formed by said punch-bit into a die, whereby said punch-bit remains in said work-piece until subsequently removed by placing said work-piece and punch-bit above said retainer and driving said punch-bit from said work-piece into said retainer and then, upon continuation of the driving force, driving said punch-bit through said retainer and into a second work-piece, thereby leaving a hole in said first work-piece.

16. A method of punching an opening in a sheet of material whereby a punch medium is transferred under pressure from said sheet, to a guiding means between said sheet and a second sheet, thence to said second sheet.

17. A method of punching openings in sheets of material whereby punch mediums are transferred under pressure from the first sheet of a pair of work-sheets to guiding means located between said pair of work-sheets, thence into the second sheet of said work-sheets, said punch mediums remaining in said second work-sheet and being released from said first work-sheet and said guiding means.

18. A method of punching consisting in providing a short punch-bit, embedding said bit in a first piece of material, placing said material and bit on a master plate having guide means for said bit, placing a counterpart of said piece of material under said master plate and then pressing said bit through said first piece and guide means into said counterpart whereby said first piece is punched and said counterpart has the punch-bit embedded in it.

19. The method of punching holes in a metal work-piece with the use of a jig plate having openings formed therein in predetermined relative positions, which comprises locating the jig plate in a predetermined position relative to the work-piece on one face thereof with punch-bits slidably mounted in the openings, closely confining the face of the work-piece remote from the jig plate around free spaces directly opposite to and co-extensive in area with the ends of the punch-bits, subjecting the punch-bits simultaneously to an impact to cause the ends of the punch-bits adjacent the work-piece to punch holes in the work-piece over said free spaces and move into the holes, then stripping the jig plate from the work-piece and replacing the latter with a second work-piece, placing the jig plate on said second work-piece, then placing the first work-piece, having said punch-bits lodged in it on said jig plate, again subjecting the punch-bits simultaneously to an impact to cause the punch-bits to leave their lodging places in said first work-piece and to travel again through said openings in said jig plate and to cause the ends of the punch-bits to punch holes in said second work-piece and move into the holes and to remain there until transferred to a third work-piece upon repetition of the method thereby producing the desired holes in each work-piece from which said punch-bits are removed.

20. The method of punching holes in a metal work-piece with the use of a jig plate having openings formed therein in predetermined positions relative to a reference on the jig plate, which comprises locating the jig plate on one side of the work-piece and interlocking the jig plate and work-piece at said reference and at a predetermined reference on the work-piece with the punch-bits slidably mounted in said openings, subjecting the punch-bits simultaneously to an impact to cause the ends of the punch-bits adjacent the work-piece to punch holes in the work-piece and move into the holes, then after removing the jig plate and replacing the work-piece with a counterpart, placing the jig plate on said counterpart, then placing the work-piece, having said punch-bits lodged in it on said jig plate and again subjecting the punch-bits simultaneously to an impact to cause the punch-bits to leave their lodging places in said work-piece, and to travel again through said openings in said jig plate and to cause the ends of the punch-bits to punch holes in said counterpart and move into the holes and to remain there until transferred to another counterpart upon repetition of the operation, thereby producing the desired holes in said work-piece and each counterpart from which said punch-bits are removed.

21. The method of punching holes in a work-piece with the use of a die plate and a jig plate having openings therein in predetermined positions relative to a reference on either of said plates which comprises placing the work-piece between the die plate and the jig plate with punch-bits in the jig plate openings, interlocking the die plate and jig plate at said references, subjecting the punch-bits simultaneously to an impact to cause the ends of the punch-bits adjacent the work-piece to punch holes in the work-piece and move into the holes, then after removing the jig plate and replacing the work-piece with a counterpart, placing the jig plate on said counterpart, then placing the work-piece, having said punch-bits lodged in it on said jig plate and again subjecting the punch-bits simultaneously to an impact to cause the punch-bits to leave their lodging places in said work-piece and to travel again through said openings in said jig plate and to cause the ends of the punch-bits to punch holes in said counterpart and move into the holes and to remain there until transferred to another counterpart upon repetition of the operation, thereby producing the desired holes in said work-piece and each subsequent counterpart from which said punch-bits are removed.

22. An apparatus for punching a hole in a work-piece, which comprises a jig plate having an opening for receiving a punch-bit, means for interlocking the jig plate and work-piece with said opening disposed in a predetermined position relative to the work-piece, and a punch anvil engageable with the end of the punch-bit remote from the work-piece for causing the opposite end to punch a hole in the work-piece and move into the hole and means for locating said work-piece with said punch-bit lodged in it above said jig plate in such manner that a counterpart which replaces said work-piece under said plate will receive said punch-bit in the same location as it is in said work-piece when said bit is caused by said punch to move from said work-piece through said jig plate opening and into said counterpart, thus producing the desired hole in said work-piece.

23. An apparatus for punching a hole in a work-piece which comprises a die having a seat for the work-piece, a jig having an opening for receiving a punch-bit, means for interlocking the die, the work-piece and the jig with the work between the die and jig and with said opening disposed in a predetermined position relative to the work-piece, and a punch anvil engageable with the end of the punch-bit remote from the work-piece for causing the opposite end to punch a hole in the work-piece and move into the hole and means for locating said work-piece with said punch-bit lodged in it above said jig in such manner that a counterpart which replaces said work-piece under said jig will receive said punch-bit in the same location it is in said work-piece when said bit is caused by said punch to move from said work-piece through said jig opening and into said counterpart, thus producing the desired hole in said work-piece.

24. An apparatus for punching a multiplicity of holes in a work-piece which comprises a die having a seat for the work-piece and a plurality of openings in the seat, a jig having a plurality of openings for receiving punch-bits, means for interlocking the die, the work-piece and the jig with the work-piece between the die and jig and with said openings in alinement, a punch anvil engageable with the ends of the punch-bit remote from the work-piece for causing the opposite ends to punch holes in the work-piece and move into the holes and means for positioning said punch-bits, while lodged in said work-piece, above said jig openings in such manner that a counterpart which replaces said work-piece under said jig will receive said punch-bits in the same locations they are in said work-piece when said bits are caused to move from said work-piece through said jig openings and into said counterpart, thus producing the desired multiplicity of holes in said work-piece.

25. An apparatus for punching a multiplicity of holes in a work-piece which comprises a die having a seat for the work-piece, a jig having a plurality of openings for receiving punch-bits, means for interlocking the die, the work-piece and the jig with the work-piece between the die and jig and with said openings disposed in predetermined positions relative to the work-piece, a punch anvil engageable with the ends of the punch-bits remote from the work-piece for causing opposite ends to punch holes in the work-piece and move into the holes and means for positioning said punch-bits, while lodged in said work-piece, above said jig openings in such manner that a counterpart which replaces said work-piece under said jig will receive said punch-bits in the same locations they are in said work-piece when said bits are caused to move from said work-piece through said jig openings and into said counterpart, thus producing the desired multiplicity of holes in said work-piece.

26. An apparatus for punching a multiplicity of holes in a work-piece which comprises a die having a seat for the work-piece and a plurality of openings in the seat, a plurality of pins projecting from the seat, a jig having a plurality of openings for receiving punch-bits and other openings for receiving said pins, said openings in the jig being disposed in predetermined relative positions, the pins extending outside at the area of the work-piece into the jig to interlock the members with the work-piece between the die and jig and with said first openings in the jig and said die openings in alinement and a punch anvil engageable with the ends of the punch-bits remote from the work-piece for causing the opposite ends to punch holes in the work-piece and move into the holes and means for positioning said punch-bits, while lodged in said work-piece, above said jig openings in such manner that a counterpart which replaces said work-piece under said jig will receive said punch-bits in the same locations as they are in said work-piece when said bits are caused to move from said work-piece through said jig openings and into said counterpart, thus producing the desired multiplicity of holes in said work-piece.

27. An apparatus for punching a multiplicity of holes in a work-piece which comprises a die having a seat for the work-piece and a plurality of openings in the seat, a jig having a plurality of openings for receiving punch-bits, a plurality of pins projecting from the die seat to form a nest around the periphery of the work-piece and having a close fit around same, the pins having an end portion fitted closely in other openings in the jig located in a predetermined position relative to said first openings in the jig, whereby the die, the work-piece and the jig are interlocked with said punch-bit and die openings in alinement, and a punch anvil engageable with the ends of the punch-bits remote from the work-piece for causing the opposite ends to punch holes in the work-piece and move into the holes and means for positioning said punch-bits, while lodged in said work-piece, above said jig openings in such manner that a counterpart, which replaces said work-piece under said jig will receive said punch-bits in the same locations they are in said work-piece when said bits are caused to move from said work-piece through said jig openings and into said counterpart, thus producing the desired multiplicity of holes in said work-piece.

28. Means for positioning a multiplicity of punch elements in axial alinement with their companion guide apertures in a plate, consisting in lodging said elements in a member by guiding them through said plate, then placing said member on the opposite side of said plate with projecting ends of the punch elements entered into said guide apertures.

29. A sheet material perforating apparatus comprising punch-bit guide means, for operation between two work-pieces, and die means, alined in coaxial relation with one another in such manner that punch-bits lodged in one of the work-pieces placed on said guide means are transferred, under pressure, from said work-piece, to said guide means, thence to the other work-piece resting on said die means.

30. Means for placing each of a plurality of punch elements in axial alinement with its respective guide aperture in a jig plate consisting in lodging said elements in a member in accordance with the pattern of apertures in said plate in such manner that at least two of said elements extend beyond the face of said member to engage their respective apertures when said member is placed upon said jig plate.

31. A perforating apparatus including a die plate having a plurality of die openings, a punch-bit carrying plate guided for movement toward and from said die plate and having apertures arranged with each aperture in axial alinement with a die opening, punch-bits having their work-piece penetrating ends guided in said apertures in said carrying plate and being retained in said position by a work-piece in which they are lodged in such manner that force applied on said punch-bits drives them out of the work-piece and into the apertures in said punch-bit plate thus leaving holes formed in said work-piece at locations from which said punch-bits are removed.

32. The method of punching a multiplicity of holes in a first work-piece by using a second work-piece to locate travelling punch elements in coaxial relation with guide apertures which extend through a master member, said first work-piece being positioned at one end of said apertures and being interposed between said apertures and die means having openings directly opposite and coextensive with said apertures and then subjecting said punching elements to an impact to cause the ends of same adjacent said first work-piece to move through said apertures and to punch holes and move into the holes whereby the desired multiplicity of holes are formed in said first work-piece.

33. A hole punching apparatus for use in a press having a stationary bed and reciprocating ram, comprising a die set having a lower shoe adapted to be rigidly mounted to said bed, an upper shoe adapted to be rigidly mounted to said ram, and means for causing the two shoes to operate in alinement, a pair of templates, one under said upper shoe, the other upon said lower shoe, mounted in such manner that the upper template is resiliently held in spaced relation to the upper shoe so that a first work-piece in which a plurality of punch elements are lodged may be inserted into said space and positioned with said bits in axial alinement with apertures through said template; and the lower template, which is provided with a plurality of die elements for cooperation with said punch elements, is securely mounted to the lower shoe in such manner that a second work-piece placed upon said die elements will receive said punch elements when said ram forces said elements from said first work-piece through said apertures.

34. A hole punching apparatus according to claim 33 and including means for supporting said upper template against distortion forces exerted by the resilient elements.

GEORGE F. WALES.